(12) United States Patent
Houdek et al.

(10) Patent No.: US 12,044,855 B2
(45) Date of Patent: Jul. 23, 2024

(54) VISION MODULE FOR HELMET MOUNTED VISUAL COMMUNICATION AND NAVIGATION SYSTEM

(71) Applicant: Qwake Technologies, Inc., San Francisco, CA (US)

(72) Inventors: Phil Houdek, San Jose, CA (US); Mike Ralston, Mountain View, CA (US); Omer Haciomeroglu, Austin, TX (US); Sam Cossman, Austin, TX (US)

(73) Assignee: Qwake Technologies, Inc., San Francisco, CA (US)

( * ) Notice: Subject to any disclaimer, the term of this patent is extended or adjusted under 35 U.S.C. 154(b) by 0 days.

(21) Appl. No.: 18/371,509

(22) Filed: Sep. 22, 2023

(65) Prior Publication Data

US 2024/0103276 A1 Mar. 28, 2024

Related U.S. Application Data

(60) Provisional application No. 63/409,200, filed on Sep. 22, 2022.

(51) Int. Cl.
*G02B 27/01* (2006.01)

(52) U.S. Cl.
CPC ..... *G02B 27/0172* (2013.01); *G02B 27/0176* (2013.01)

(58) Field of Classification Search
CPC ............ G02B 27/0172; G02B 27/0176; G02B 2027/0138; G02B 2027/014
See application file for complete search history.

(56) References Cited

U.S. PATENT DOCUMENTS

| | | | | |
|---|---|---|---|---|
| 9,529,200 B2* | 12/2016 | Thurber | ............ | H04N 21/4126 |
| 9,565,885 B2* | 2/2017 | Hedges | ............... | G02B 27/0176 |
| 9,766,461 B2* | 9/2017 | Riccomini | ......... | G02B 27/0176 |
| 10,795,164 B1* | 10/2020 | Chao | ...................... | H04N 23/60 |
| 10,877,278 B2* | 12/2020 | Collins | ............ | G02F 1/133528 |
| 11,127,215 B1* | 9/2021 | Narvaez | ................. | G09G 3/001 |
| 11,187,908 B2* | 11/2021 | Magyari | ................ | G02B 7/004 |
| 11,442,280 B2* | 9/2022 | McCracken | ....... | G02B 27/0176 |
| 11,526,015 B2* | 12/2022 | Ellis | ...................... | B29C 44/582 |
| 11,533,443 B2* | 12/2022 | Legerton | ............... | H04N 23/80 |
| 11,693,242 B2* | 7/2023 | Fortin-Deschênes et al. ............. G02B 27/017 345/8 |

(Continued)

*Primary Examiner* — Vinh T Lam
(74) *Attorney, Agent, or Firm* — Marton Ribera Schumann & Chang LLP; Chien-Ju Alice Chuang

(57) ABSTRACT

The technology described herein relates to a vision module for a helmet mounted visual communication and navigation system. A vision module for a helmet mounted visual communication and navigation system may include a sensor directed out of a front portion of a vision module housing, a heads up display (HUD) combiner subassembly including two or more shells, a combiner glass, and a combiner mount frame, a cable connection interface, a laser configured to direct a laser beam out of a laser aperture in the front portion of the vision module housing, and one or more user control buttons. The two or more shells may be treated to minimize fogging and optical distortion for viewing of the combiner glass display. The sensors may include a thermal camera (e.g., a thermal imaging camera), a situational awareness sensor, and a biometric sensor.

22 Claims, 11 Drawing Sheets

(56) References Cited

U.S. PATENT DOCUMENTS

| | | | |
|---|---|---|---|
| 2007/0064311 A1* | 3/2007 | Park | G02B 27/0172 359/630 |
| 2010/0128135 A1* | 5/2010 | Filipovich | G02B 23/125 348/217.1 |
| 2022/0091424 A1* | 3/2022 | Baudou | G02B 23/125 |

* cited by examiner

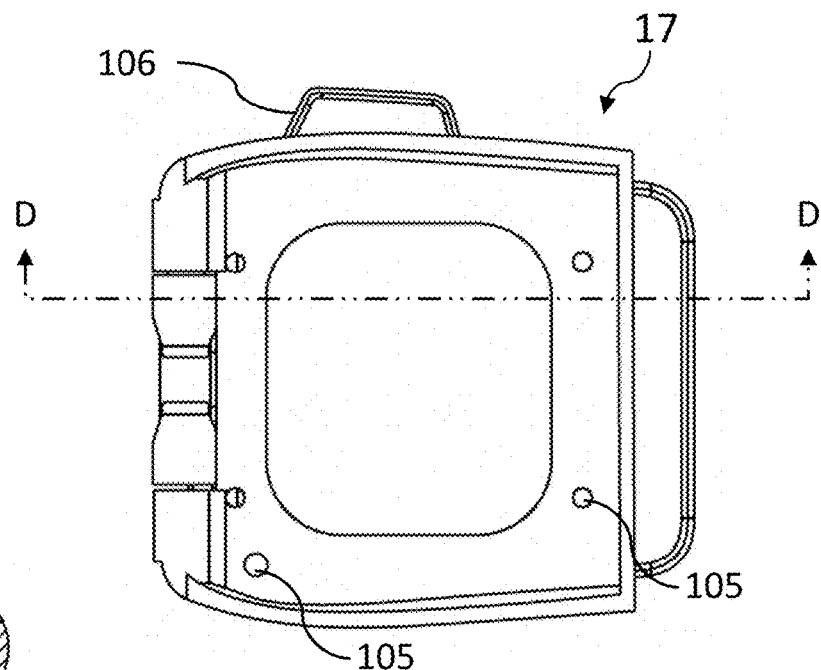
FIGURE 9F
FIGURE 9G
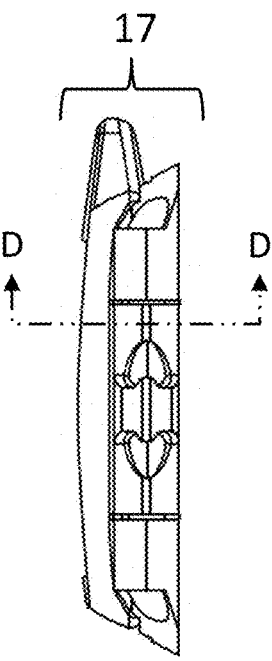
FIGURE 9E

VISION MODULE FOR HELMET MOUNTED VISUAL COMMUNICATION AND NAVIGATION SYSTEM

CROSS-REFERENCE TO RELATED APPLICATIONS

This application claims priority to U.S. Provisional Patent Application No. 63/409,200 entitled "Vision Module for Helmet Mounted Navigation and Communications System," filed Sep. 22, 2022, the contents of which are hereby incorporated by reference in their entirety.

FIELD OF INVENTION

The present invention relates to fire fighting and life safety gear. More particularly, the invention is directed to a wearable helmet mounted visual communication and navigation system.

BACKGROUND OF INVENTION

Fire fighting, life safety situations, and emergency rescues frequently create a need for emergency response personnel to be able to see in the dark and through smoke. In life safety situations, navigation and communications gear that can provide emergency response personnel with more information to safely and quickly operate is essential. Conventional solutions include handheld thermal cameras, handheld radios, shoulder microphones, face mask mounted microphones and radios, flashlights, and physical tags. However, handheld implementations are cumbersome in emergency situations, and occupy hands that are needed for other tasks. Handheld implementations also often operate at a relatively larger distance from a user's eye, which increases the likelihood that smoke will obscure the visual path between the user's and the display screen.

Problems with existing solutions for mounting thermal cameras, or other navigation and communications gear, onto a user's wearable safety helmet or other wearable safety gear (i.e., onto a part of a uniform or other body-worn gear) includes unevenly weighing down a front or side of helmets and body-worn gear, snag hazards, and, when mounted onto other wearable safety gear, lack of ability to track a user's head motion.

Therefore, a vision module for a helmet mounted (i.e., hands free) visual communication and navigation system is desirable.

BRIEF SUMMARY

The present disclosure provides for a vision module for a helmet mounted visual communication and navigation system. A vision module for a helmet mounted visual communication and navigation, may include: a sensor provided behind a glass-covered aperture on a front portion of a vision module housing; a heads up display (HUD) combiner subassembly comprising a world facing combiner shell, a combiner glass, a user facing combiner shell, and a combiner mount frame; a cable connection interface; a laser configured to direct a laser beam out of a laser aperture in the front portion of the vision module housing; a mating element configured to couple to a vision module attachment; and one or more user control buttons.

In some examples, the sensor comprises one, or a combination, of a thermal camera, a situational awareness sensor, and a biometric sensor. In some examples, the situational awareness sensor comprises one, or a combination, of a thermal imaging camera (TIC), a radiometric thermal camera, a drone camera, a spectrometer, a photosensor, a magnetometer, a seismometer, a gas detector, a chemical sensor, a radiological sensor, a voltage detector, a flow sensor, a scale, a thermometer, a pressure sensor, an acoustic sensor, an inertial measurement unit, a GPS sensor, a speedometer, a pedometer, an accelerometer, an altimeter, a barometer, an attitude indicator, a depth gauge, a compass, and a gyroscope. In some examples, the biometric sensor comprises one, or a combination, of a heart rate sensor, a blood pressure monitor, a glucose sensor, an electrocardiogram (EKG) sensor, an electroencephalogram (EEG) sensor, an electromyography (EMG) sensor, a respiration sensor, and a neurological sensor. In some examples, the mating element comprises a protrusion configured to couple to a latch pocket on the vision module attachment.

In some examples, the HUD combiner subassembly comprises a clutch mechanism that includes a combiner pivot mechanism, the clutch mechanism configured to enable a display portion of the HUD combiner subassembly to flip to and from a first position to a second position. In some examples, the cable connection interface comprises an ingress protected locking electrical connector configured to mate with a corresponding connection interface on an end of a cable. In some examples, the vision module also includes a finger placement guide between at least two of the one or more user control buttons. In some examples, the vision module housing is shaped to avoid being a snag hazard.

In some examples, the vision module attachment is configured to removably couple the vision module to a front portion of the helmet. In some examples, the vision module attachment comprises a latch pocket, a preload bumper, and a latching mechanism. In some examples, the preload bumper comprises a material configured to be deformed by application of physical pressure and to recover an original shape after removal of the physical pressure. In some examples, the material is configured to be compressed when the vision module is coupled to the vision module attachment to create a stable motion-free connection. In some examples, the preload bumper comprises a semi-soft elastomer. In some examples, the latching mechanism comprises a sliding tab configured to secure the vision module into a locked position wherein a protrusion on the mating element is received by the latch pocket, wherein the sliding tab may be moved to an unlocked position to release the vision module from the vision module attachment.

1. In some examples, the world facing combiner shell and the user facing combiner shell are coated with a hydrophilic material configured to minimize fogging and optical distortion from moisture. In some examples, the HUD combiner subassembly further comprises an adjustment tab. In some examples, the world facing combiner shell and the user facing combiner shell are coupled along a perimeter with the combiner glass enclosed within. In some examples, the world facing combiner shell, the user facing combiner shell, and the combiner glass, as assembled, is configured to pivot to two or more positions about an axis of a combiner pivot mechanism. In some examples, the combiner glass is configured to display a graphical user interface (GUI), and the world facing combiner shell and user facing combiner shell comprising a clear material configured to enable viewing of the GUI. In some examples, the HUD combiner subassembly is configured to provide a representation of an environment from a user's point of view. In some examples, the HUD combiner subassembly comprises a display facing a user within the user's field of vision.

BRIEF DESCRIPTION OF THE DRAWINGS

Various non-limiting and non-exhaustive aspects and features of the present disclosure are described hereinbelow with references to the drawings, wherein:

FIG. 9E is a side view of an exemplary heads up display combiner subassembly in a closed position, in accordance with one or more embodiments.

FIG. 9F is a front view of an exemplary heads up display combiner subassembly in a closed position, in accordance with one or more embodiments.

FIG. 9G is a cross-section view of an exemplary heads up display combiner subassembly in a closed position, in accordance with one or more embodiments.

Figure 1A:
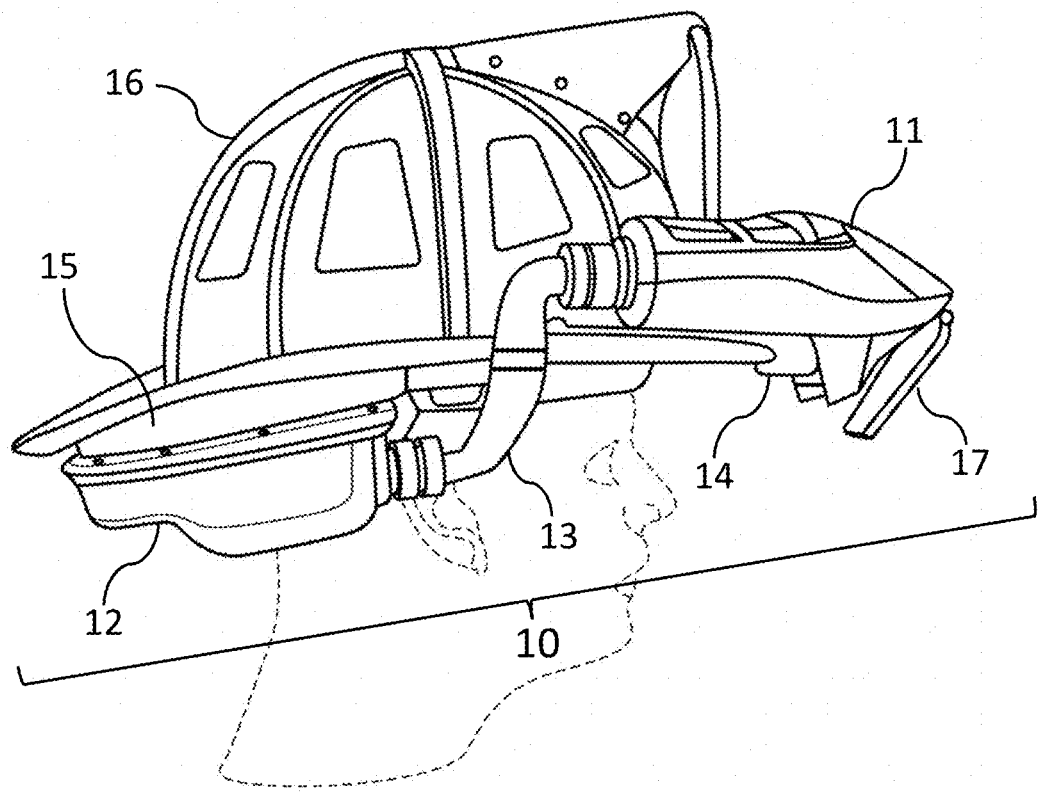
FIGS. 1A-1B are a side and a perspective view of an exemplary helmet with a balanced helmet mounted visual communication and navigation system, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to a balanced helmet mounted (i.e., hands free) visual communication and navigation system. A helmet mounted visual communication and navigation system may include a vision module coupled to a front portion (e.g., a front surface) of a helmet, a compute module coupled to a rear (i.e., back) surface of the helmet, a cable that connects the vision module and the compute module, a first attachment element configured to removably couple the vision module to the helmet, a second attachment element configured to removably couple the compute module to the helmet. The vision and compute modules may provide navigation functions (e.g., using lights, laser, camera, heads up display (HUD), navigation user interface, processing and compute for control thereof) for the balanced helmet mounted visual communication and navigation system. The vision and compute modules also may provide communication functions (e.g., using lights, laser, user control buttons). The first attachment element may comprise mating features to the helmet's contours on a first side and to the vision module on a second side. The second attachment element may comprise mating features to the helmet's contours on a first side and to the compute module on a second side. The first and second attachment elements allow the vision module and compute module, respectively, to be attached to and detached from, the helmet. In some examples, the vision module and compute module may be coupled to various different (e.g., varying designs) and unique (e.g., separate, user-specific) helmets. For example, the shape, pattern, number of adhesive mount pads, and other configurations, on a helmet-facing portion of a compute module attachment may be varied to match different types of helmets, while keeping shape and coupling elements of a compute module-facing portion of a compute module attachment matching that of a given compute module. For example, the module-facing side of a second attachment may be contoured to fit a compute module surface, this module-facing contour may be maintained across different types of helmets, while the helmet-facing side may be contoured to fit an inner helmet surface of the back portion of a helmet and may be varied across different types of helmets. This modular design allows for a given compute module to be removably coupled to different types of helmets. Similarly, the shape, pattern, helmet-coupling elements, and other configurations, on a helmet-facing portion of a vision module attachment may be varied to match different types of helmets, while keeping shape and coupling elements of a vision module-facing portion of a vision module attachment matching that of a given vision module. This modular design allows for a given compute module to be removably coupled to different types of helmets.

A visual communication and navigation system may be coupled to parts of a safety helmet and may comprise built-in thermal camera and other sensors, a HUD to view enhanced visual information comprising both raw and processed sensor data from said thermal camera and other sensors. The thermal camera and other sensors may include situational awareness sensors (e.g., cameras (e.g., a thermal imaging camera (TIC), a radiometric thermal camera, a drone camera), a spectrometer, a photosensor, a magnetometer, a seismometer, a gas detector, a chemical sensor, a radiological sensor, a voltage detector, a flow sensor, a scale, a thermometer, a pressure sensor, an acoustic sensor (e.g., selective active noise cancellation to facilitate radio communication), an inertial measurement unit, a GPS sensor, a speedometer, a pedometer, an accelerometer, an altimeter, a barometer, an attitude indicator, a depth gauge, a compass (e.g., fluxgate compass), a gyroscope, and the like) and biometric sensors to measure (e.g., monitor) health conditions and status of a user (e.g., a heart rate sensor, a blood pressure monitor, a glucose sensor, an electrocardiogram (e.g., EKG or ECG) sensor, an electroencephalogram (EEG) sensor, an electromyography (EMG) sensor, a respiration sensor, a neurological sensor, and the like). In some examples, the visual communication and navigation system also may include a pointing laser (e.g., for depth measurement in an extreme environment with low visibility, otherwise to help a user navigate, as well as a visual indication to other personnel of the user's presence and approximate location) and other tools.

The visual communication and navigation system may be helmet mounted such that the visual and other sensors can track a user's head motion and approximates where the user is looking so that the HUD may include the user's current point of view. For example, the HUD may be configured to display a representation of a user's environment from the user's point of view. The HUD display may face the user within the user's field of vision. Such a helmet mounted system also reduces snag hazard and allows for integration with streamlined emergency personnel procedures and workflows.

The visual communication and navigation system may comprise two or more modules to be coupled at different locations on a helmet, the two or more modules configured to minimize the added moment of inertia to reduce a user's perceived mass of the system. The two or more modules may be strategically placed to wrap around inner and outer surfaces of a helmet largely using available, unused space within and around a helmet. The two or more modules may be configured to implement a cognitive load reducing platform comprising a plurality of sensors, a compute subassembly (e.g., processor, memory) configured to execute a cognitive enhancement engine (e.g., software-based engine configured to process sensor data into enhanced characterization data configured to provide contextual and physiological visual, auditory, and/or haptic cues and information), and an output device (e.g., HUD, other visual display, headphones, earbuds, other auditory output devices, haptic device, and the like).

The two or more modules may include a vision module comprising a heads up display (HUD) combiner subassembly, one or more user control buttons, a laser, an indicator light, a camera and other sensors, and a cable connection interface, or a sub-combination thereof, as described in more detail herein. The two or more modules also may include a compute module comprising at an internal core subassembly including least some of the electronics for operation of the visual communication and navigation system (e.g., a circuit board assembly (e.g., CPU, other PCB or processing unit), memory, an antenna, and other computing components), heat management elements (e.g., heat reservoirs and heat spreaders), power module (e.g., battery module, charging module, power cord port, and other means of providing power to operate the visual communication and navigation system), or a sub-combination thereof, as described in more detail herein. In some examples, the compute module also may include a sensor (e.g., NFC tag reader, RFID tag reader, camera, scanner, combined NFC-RFID antenna, and the like). In some examples, the compute module also may comprise one or more lights as part of a visual communications system (e.g., controlled using manual inputs (e.g., user control buttons) and passive inputs (e.g., sensor data, communications data, and the like)).

In some examples, the visual communication and navigation system may include thermal protection features to protect electronic parts and systems, including heat resistant materials, insulation, heat reservoirs (e.g., heatsinks comprising phase change material to store heat dissipated from electronic parts and systems), heat spreaders, and the like.

Figure 1B:
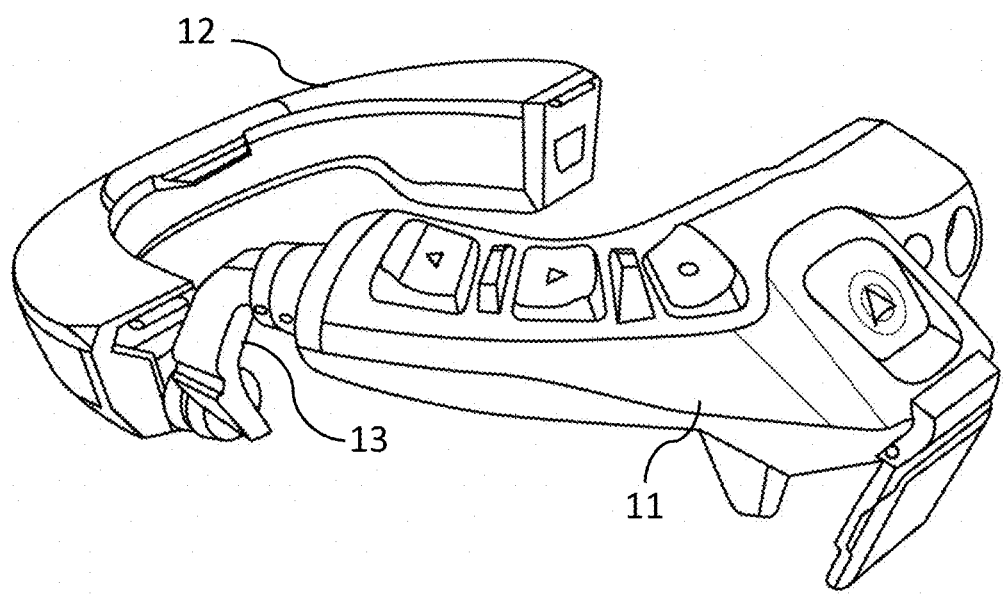

FIGS. 1A-1B are a side and a perspective view of an exemplary helmet with a balanced helmet mounted visual communication and navigation system, in accordance with one or more embodiments. A visual communication and navigation system 10 may be removably coupled (e.g., attached and detached using attachments 14-15) to helmet 16. Vision module 11 and compute module 12 are shown connected using cable 13 (e.g., comprising a system cable, a data cable, and/or other cables and wires). In some examples, vision module 11 attaches and detaches to vision module attachment 14 without tools, and compute module 12 similarly attaches and detaches to compute module attachment 15 without tools. Vision module attachment 14 and compute module attachment 15 may be more permanently coupled (e.g., adhesively bonded, mechanically attached) to helmet 16. In some examples, vision module attachment 14 may be coupled to a top surface of a front brim of helmet 16, as shown. In some examples, compute module attachment 15 may be coupled to a bottom surface of a back portion (e.g., brim) of helmet 16, as shown. Vision module 11 may include heads up display (HUD) combiner subassembly 17, which is shown in a partially open position wherein the display portion is flipped partially down (e.g., a position wherein the display is viewable by a user). As shown in FIG. 1B, a HUD may flip down into an open position to occupy a portion of a user's field of view. Said HUD may flip up into a closed position when not in use. In some examples, the HUD may be formed using materials able to withstand high heat, smoke-filled, and other extreme conditions. In some examples, the HUD may comprise a plurality of layers, including a world facing shell, a glass or plastic mirror or partial mirror, and a user facing shell, the world facing shell and user facing shell bonded, or otherwise secured, along their perimeter edge to create a sealed volume enclosing the mirror within. In some examples, the world facing shell and user facing shell may comprise a largely clear material configured to enable viewing of the glass display (e.g., combiner glass 101 in FIG. 9C or other combiner glass also configured to display a graphical user interface) and may be coated with hydrophilic material to minimize fogging and optical distortion from moisture (e.g., encourage water sheeting). In some examples, the world facing shell and user facing shell also may be treated with a coating, or may comprise a material, that is heat and/or debris resistant.

In some examples, vision module 11 may comprise a HUD combiner subassembly, one or more user control buttons, a laser, an indicator light, a camera and other sensors, and a cable connection interface, or a sub-combination thereof, as described in more detail herein. In some examples, compute module 12 may comprise an internal core subassembly including least some of the electronics for operation of the visual communication and navigation system (e.g., a circuit board assembly (e.g., CPU, other PCB or processing unit), memory, an antenna, and other computing components), heat management elements (e.g., heat reservoirs and heat spreaders), power module (e.g., battery module, charging module, power cord port, and other means of providing power to operate the visual communication and navigation system), or a sub-combination thereof, as described in more detail herein. In some examples, the compute module also may include a sensor (e.g., NFC tag reader, RFID tag reader, camera, scanner, combined NFC-RFID antenna, and the like). In some examples, the compute module also may comprise one or more lights as part of a visual communications system (e.g., controlled using manual inputs (e.g., user control buttons) and passive inputs (e.g., sensor data, communications data, and the like)).

Visual communication and navigation system 10 may comprise a thermal protection system including heat resistant materials, insulation, heat reservoirs (e.g., heat sinks comprising phase change material configured to store heat dissipated from electronic parts and systems), heat spreaders, as described herein.

Figure 2:
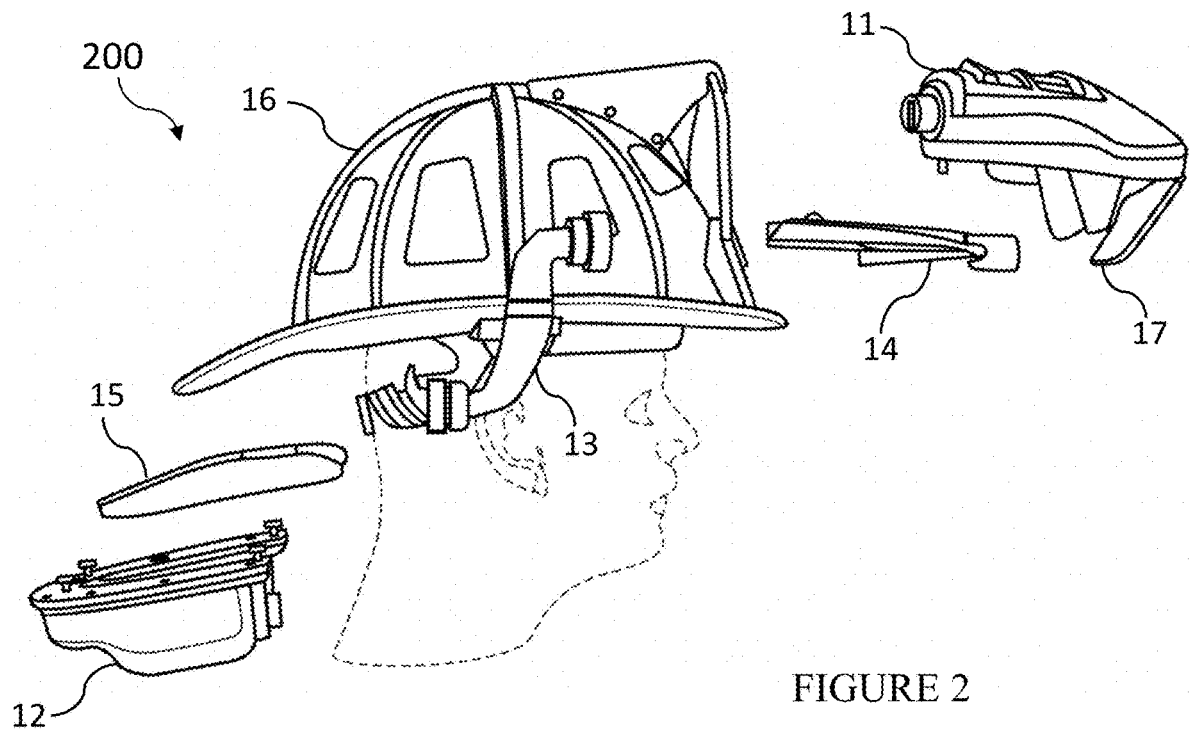
FIG. 2 is an exploded view of an exemplary helmet with a balanced helmet mounted visual communication and navigation system, in accordance with one or more embodiments.

FIG. 2 is an exploded view of an exemplary helmet with a balanced helmet mounted visual communication and navigation system, in accordance with one or more embodiments. All like-numbered elements in FIG. 2 are the same or similar to their corresponding elements in other figures. View 200 includes the same or similar vision module 11, compute module 12, cable 13, vision module attachment 14, compute module attachment 15, and helmet 16. In some examples, cable 13 may have one end removably coupled to vision module 11 and another end removably coupled to compute module 12. In some examples, cable 13 may comprise a housing, one or more electrical wires and/or light cables (e.g., coaxial, fiber optic, data, ethernet, twisted wire pairs, audio, HDMI, VGA, other video, and the like) housed (e.g., encased) within the housing, and two or more connector ends, each configured to physically, electrically, and communicatively connect to a module (e.g., vision module 11, compute module 12, and the like). In some examples, cable 13's housing may comprise heat resistant material. In some examples, cable 13's housing also may include insulation or other thermal protective features to protect electrical and/or light cables housed within from overheating. In other examples, cable 13's housing may be provided with a shape configured to approximately conform to a side contour of helmet 16 such that cable 13's housing does not jut out from helmet 16, thereby avoiding being a snag hazard (e.g., opportunity for snagging on other objects and surfaces with which the helmet, cable, and other parts of the helmet mounted visual communication and navigation system may contact). For example, as shown, said housing may be flatter left to right with a slight curve (e.g., a C-curve) so that one end connects with vision module 11 at least partly over the brim of helmet 16 and another end connects with compute module 12 at least partly under the brim of helmet 16. Also, as shown, said housing may be wider front to back to accommodate the volume of multiple cables and/or allow for cable angles due to tension or stiffness of materials. In some examples, said housing may have a slight double curve (e.g., an S-curve) in one dimension to reach corresponding connectors on two or more various modules. In other examples, cable 13's housing may comprise a flexible material able to take on any shape necessary to connect two or more modules and house any necessary electrical and light cables. In some examples, each end of cable 13 may comprise an interface for removably coupling to a corresponding connector on a module, mechanically (e.g., screwing or popping on and off) and electrically (e.g., male-female electrical, data, audio interfaces).

Figure 3:
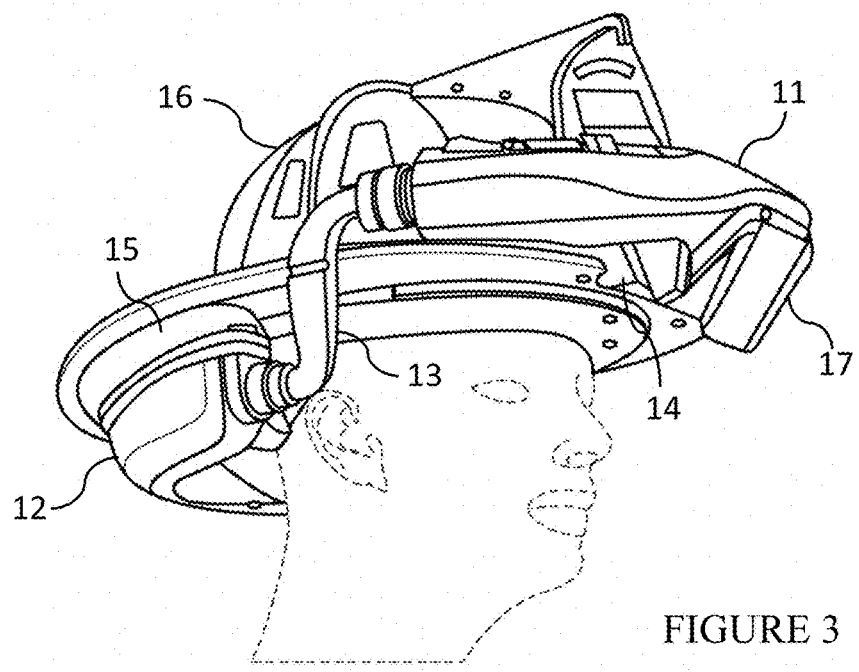
FIG. 3 is a perspective view of an exemplary helmet with a balanced helmet mounted visual communication and navigation system, in accordance with one or more embodiments.

FIG. 3 is a perspective view of an exemplary helmet with a balanced helmet mounted visual communication and navigation system, in accordance with one or more embodiments. All like-numbered elements in FIG. 3 are the same or similar to their corresponding elements in other figures.

Figure 4:
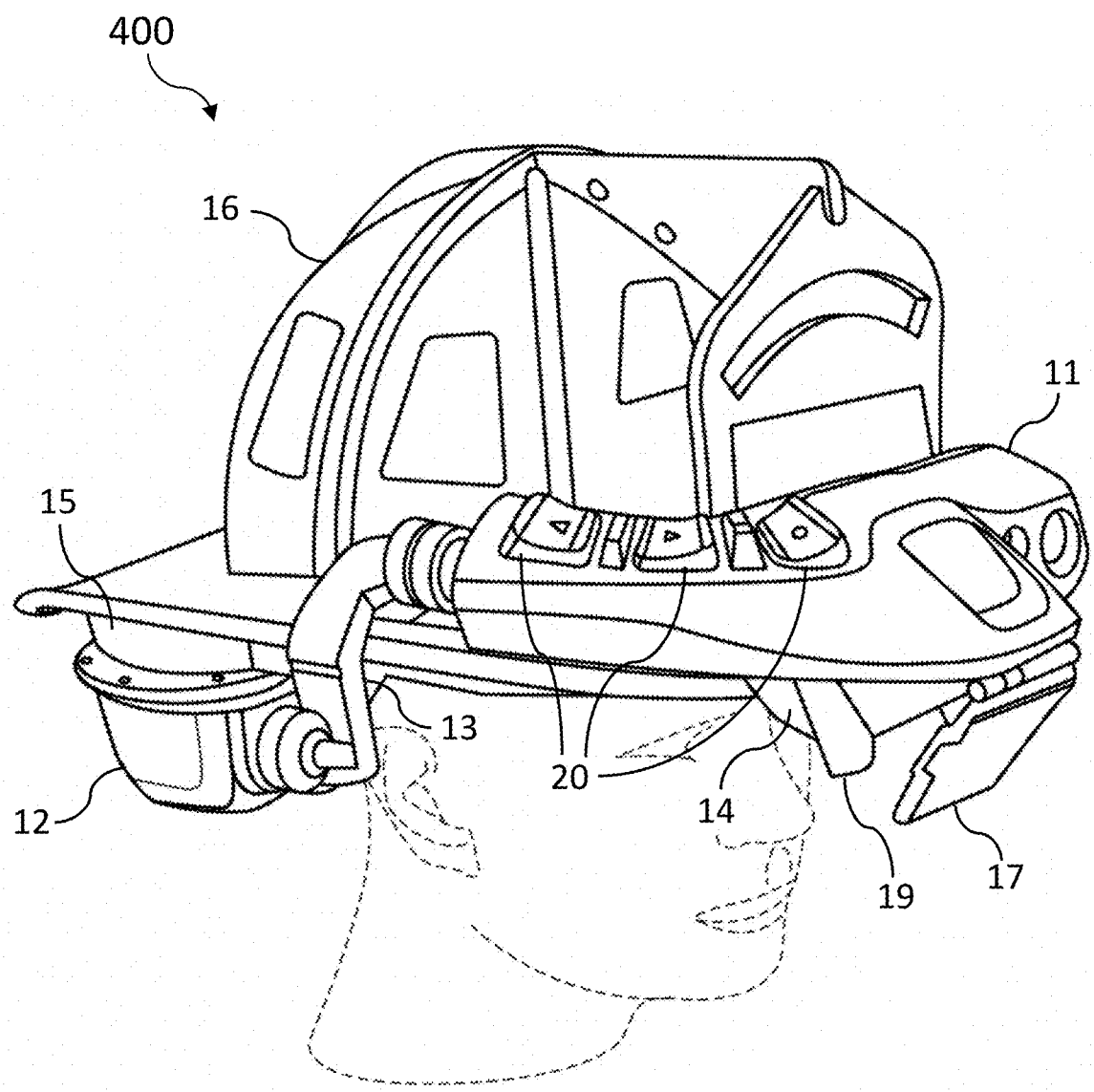
FIG. 4 is another perspective view of an exemplary helmet with a balanced helmet mounted visual communication and navigation system, in accordance with one or more embodiments.

FIG. 4 is another perspective view of an exemplary helmet with a balanced helmet mounted visual communication and navigation system, in accordance with one or more embodiments. All like-numbered elements in FIG. 4 are the same or similar to their corresponding elements in other figures. View 400 provides a top down perspective view that further shows an aperture 18, bumper(s) 19, and user control button(s) 20. In some examples, aperture 18 may be configured to provide an opening through which a thermal camera or other sensor may receive light and other sensory input. In some examples, aperture 18 may be covered with glass (e.g., germanium glass) or other material able to pass infrared light, for example, while providing an enclosure to maintain an ingress protected seal. In some examples, additional apertures may be provided on vision module 11 (e.g., for additional sensors, a laser, and the like).

In some examples, one or more bumper(s) 19 may be provided, for example, protruding down on either side of the HUD combiner subassembly 17 to protect the HUD combiner subassembly 17 from damage (e.g., from flying or falling debris, contact with obstacles, impact from normal wear and tear, and other impact from contact with surfaces and objects). In some examples, bumper(s) 19 may comprise elastomeric material.

In some examples, user control buttons 20 may control elements of a visual communications system, including one, or a combination, of a laser, lights (e.g., a rear communication (e.g., tail and/or brake) light facing backward on compute module 12, other lights on any module coupled to helmet 16 and/or coupled using cable 13), and any other visual communication unit or element on a helmet mounted visual communication and navigation system.

Figure 5:
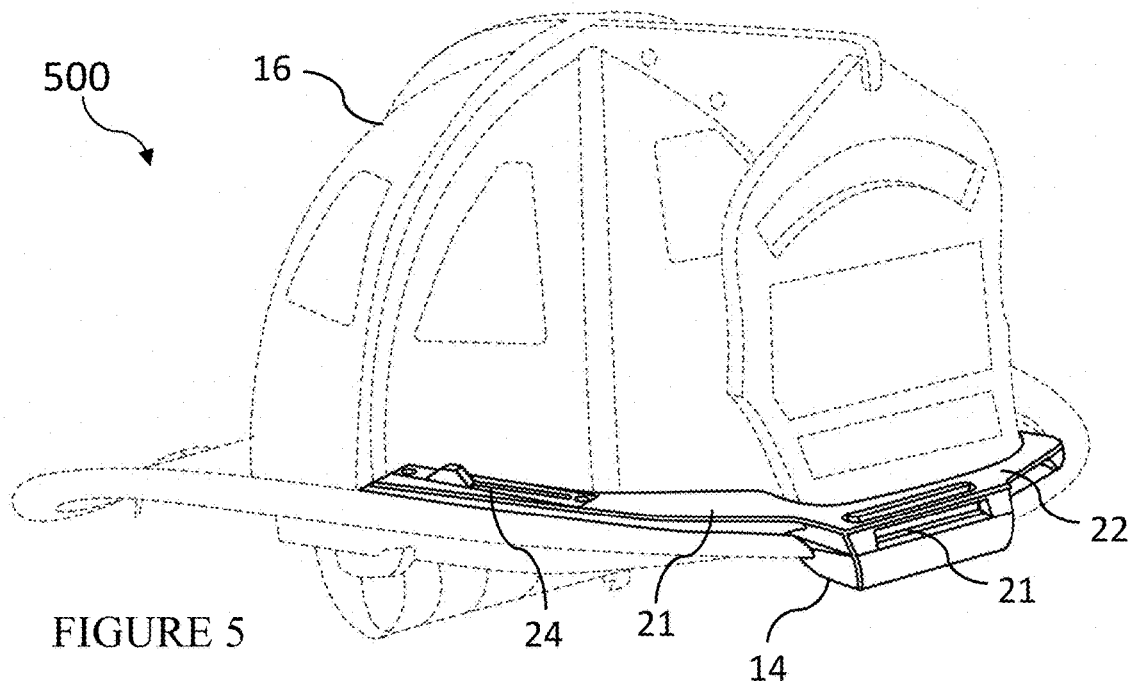
FIG. 5 is a perspective view of an exemplary attachment element configured to attach a vision module, in accordance with one or more embodiments.

FIG. 5 is a perspective view of an exemplary attachment element configured to attach a vision module, in accordance with one or more embodiments. All like-numbered elements in FIG. 5 are the same or similar to their corresponding elements in other figures. View 500 shows a vision module attachment 14 attached to a front portion (e.g., brim) of helmet 16. In some examples, vision module attachment 14 may include a latch pocket 21, a preload bumper 22, and a latch mechanism 24. Latch pocket 21 may comprise a recess configured to accept a protrusion on (e.g., protruding portion of) vision module 11, the recess configured to allow vision module 11 to lock into place. In some examples, preload bumper 22 may comprise a semi-soft elastomer, or other material configured to being deformed by application of physical pressure and to recover an original shape after removal of said physical pressure, which may be compressed to create a stable motion-free connection when vision module 11 is coupled to vision module attachment 14. When vision module 11 is coupled to vision module attachment 14, a surface of vision module 11 may be in contact with some or all of surface area 23 to provide added stability in said coupling. Latching mechanism 24 may comprise a sliding tab configured to latch onto a corresponding mating element on vision module 11 such that a protrusion of vision module 11 mates with latch pocket 21 when latching mechanism 24 latches onto said corresponding mating element on vision module 11. For example, a sliding tab on latching mechanism 24 may be configured to secure the vision module into a locked position wherein a protrusion on the mating element is received by latch pocket 21, wherein the sliding tab may be moved to an unlocked position to release vision module 11 from vision module attachment 14. In other examples, latching mechanism 24 may comprise any other mechanism enabling the removable coupling of vision module 11 to vision module attachment 14. The shape, pattern, helmet-coupling elements, and other configurations, on a helmet-facing portion of vision module attachment 14 may be varied to match different types of helmets, while keeping shape and coupling elements of a vision module-facing portion of vision module attachment 14 matching that of a given vision module 11. This modular design allows for a given compute module 11 to be removably coupled to different types of helmets.

Figure 6:
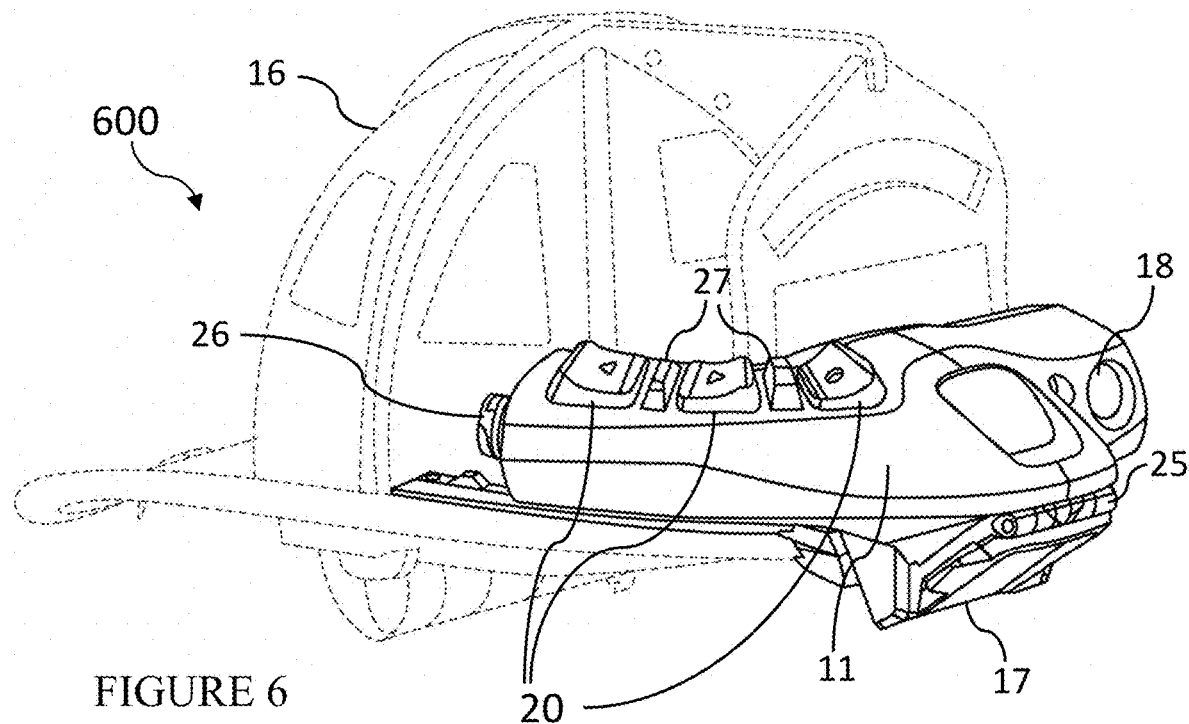
FIG. 6 is a perspective view of an exemplary vision module and its attachment element, in accordance with one or more embodiments.

FIG. 6 is a perspective view of an exemplary vision module and its attachment element, in accordance with one or more embodiments. All like-numbered elements in FIG. 6 are the same or similar to their corresponding elements in other figures. View 600 shows vision module 11 coupled to vision module attachment 14. As shown, vision module 11 includes HUD subassembly 17. HUD subassembly 17 comprises an axis of rotation and clutch mechanism 25, including a combiner pivot mechanism (e.g., pivot mechanism 103), which enables a combiner display portion of HUD subassembly 17 to be flipped to two or more positions (e.g., open, closed, up, down, partially open, partially closed, and other in between positions). In some examples, said combiner display may be adjusted to, and held open at, one or more angles.

Vision module 11 also may include a cable connection interface 26. In some examples, cable connection interface 26 may comprise an ingress protected locking electrical connector, and may be configured to mate with a corresponding connection interface on an end of cable 13. In some examples, a set of user control buttons 20 may be separated by one or more hand/finger placement guide 27, which may be molded into a surface of vision module 11's housing.

Figure 7:
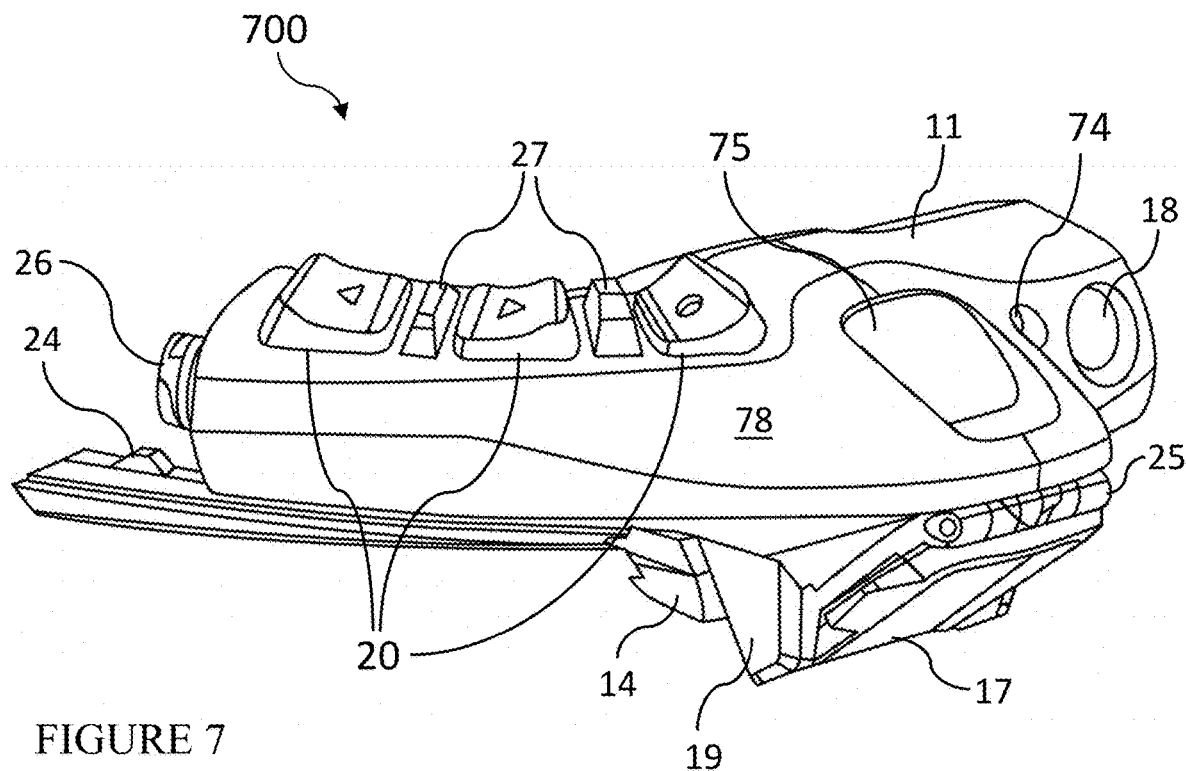
FIG. 7 is another perspective view of an exemplary vision module and its attachment element, in accordance with one or more embodiments.

FIG. 7 is another perspective view of an exemplary vision module and its attachment element, in accordance with one or more embodiments. View 700 shows vision module 11 coupled to vision module attachment 14, including HUD combiner subassembly 17, aperture 18, bumper(s) 19, user control button(s) 20, latching mechanism 24, axis of rotation and clutch mechanism 25, cable connection interface 26, and hand/finger placement guide 27. All like-numbered elements in FIG. 7 are the same or similar to their corresponding elements in other figures. Also shown in view 700 is laser aperture 74, and housing regions 75 and 78. Laser aperture 74 may be configured to provide an exit aperture for a pointing laser. In some examples, housing region 75 may be configured to provide additional stiffness and for aesthetic purposes (e.g., break up housing surface, such as housing region 78, to make vision module 11 appear smaller, provide an area for company branding, and the like). Housing region 78 may be configured to minimally protrude out or away from helmet 16, and may be shaped (e.g., sculpted, contoured, otherwise formed) to reduce snag hazard (e.g., with a smooth surface). In some examples, housing region 78 also may provide a surface for a user to rest a part of their hand while operating user control button(s) 20. In some examples, finger placement guide 27 may be configured (e.g., shaped, placed, have a given height) to assist a user wearing gear (e.g., gloves and other protective gear) in distinguishing between location and function of two or more user control button(s) 20.

Figure 8:
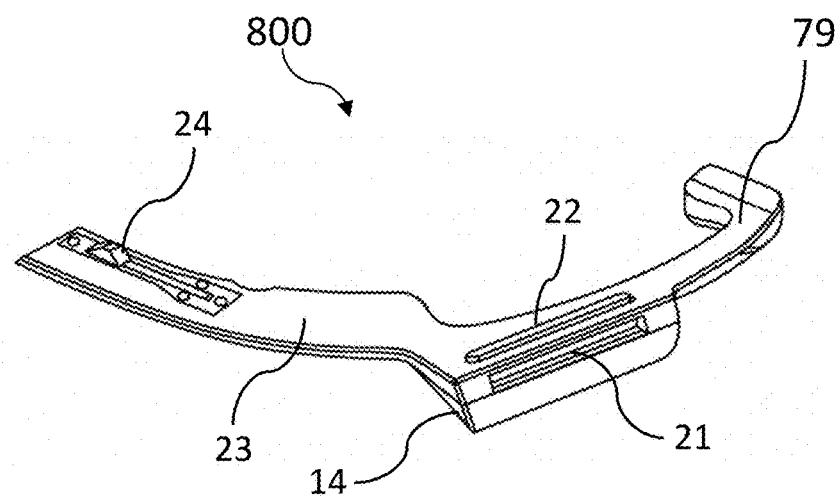
FIG. 8 is another perspective view of an exemplary attachment element configured to attach a vision module to a surface of a helmet, in accordance with one or more embodiments.

FIG. 8 is another perspective view of an exemplary attachment element configured to attach a vision module to a surface of a helmet, in accordance with one or more embodiments. View 800 shows vision module attachment 14, latch pocket 21, preload bumper 22, surface area 23, and latch mechanism 24. All like-numbered elements in FIG. 8 are the same or similar to their corresponding elements in other figures. View 800 further shows arm 79, which may provide a larger surface area for improved (e.g., more secure) coupling to helmet 16 and better attachment purchase by vision module 11 on a left side of vision module attachment 14.

Figure 9A:
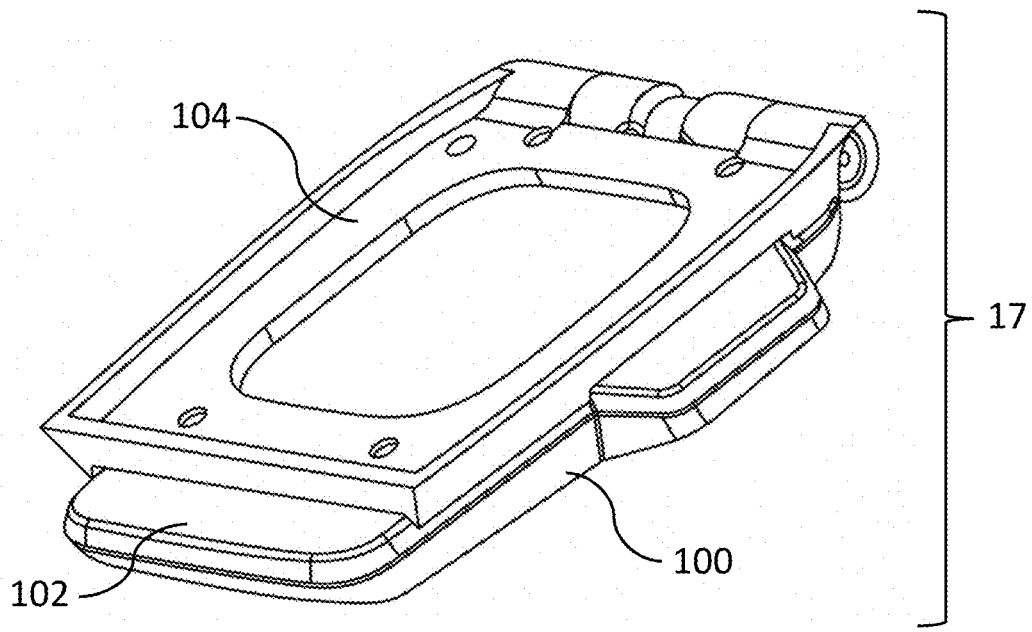
FIG. 9A is a perspective view of an exemplary heads up display combiner subassembly in a first position, in accordance with one or more embodiments.
Figure 9B:
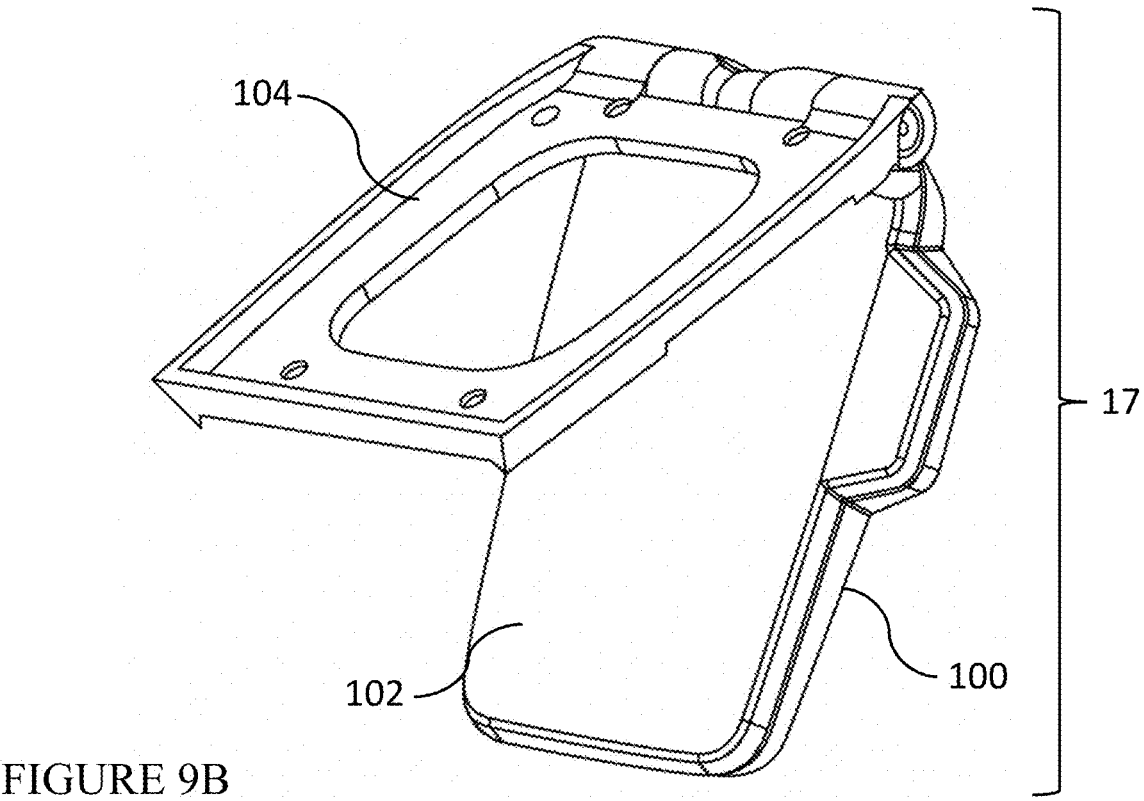
FIG. 9B is a perspective view of an exemplary heads up display combiner subassembly in a second position, in accordance with one or more embodiments.

FIG. 9A-9B are perspective views of an exemplary heads up display combiner subassembly in a first position and a second position, respectively, in accordance with one or more embodiments. In some examples, the first position may be a closed or partially closed position. In some examples, the second position may be an open, partially open, open to a given angle, or otherwise viewable position. HUD combiner subassembly 17 may comprise a world facing combiner shell 100, user facing combiner shell 102, and a combiner mount frame 104. All like-numbered elements in FIGS. 9A and 9B are the same or similar to their corresponding elements in other figures. As shown, combiner mount frame 104 may comprise mounting holes (e.g., mounting holes 105 in FIG. 9F)—4 are shown—for receiving screws to attach combiner mount frame 104 to vision module 11. In an example, combiner glass 101 may be adhesively bonded to world facing combiner shell 100 along its perimeter edge. Combiner glass 101 may be configured to display a graphical user interface (GUI). World facing combiner shell 100 and user facing combiner shell 102 may be coated with a hydrophilic material to minimize fogging and optical distortion from moisture (e.g., by increasing water sheeting). An adjustment tab (e.g., combiner adjustment tab 106 in FIG. 9G) may be provided on a side of HUD combiner subassembly 17 to enable a user to adjust the angle of the HUD without negatively impacting the display (e.g., smudging or wiping dirt on the display screen) even with wet or dirty hands. In FIG. 9B, the adhesively bonded subassembly of the world facing combiner shell 100, combiner glass (e.g., combiner glass 101 in FIG. 9C), and user facing combiner shell 102 pivots out and away from combiner frame mount 104.

Figure 9C:
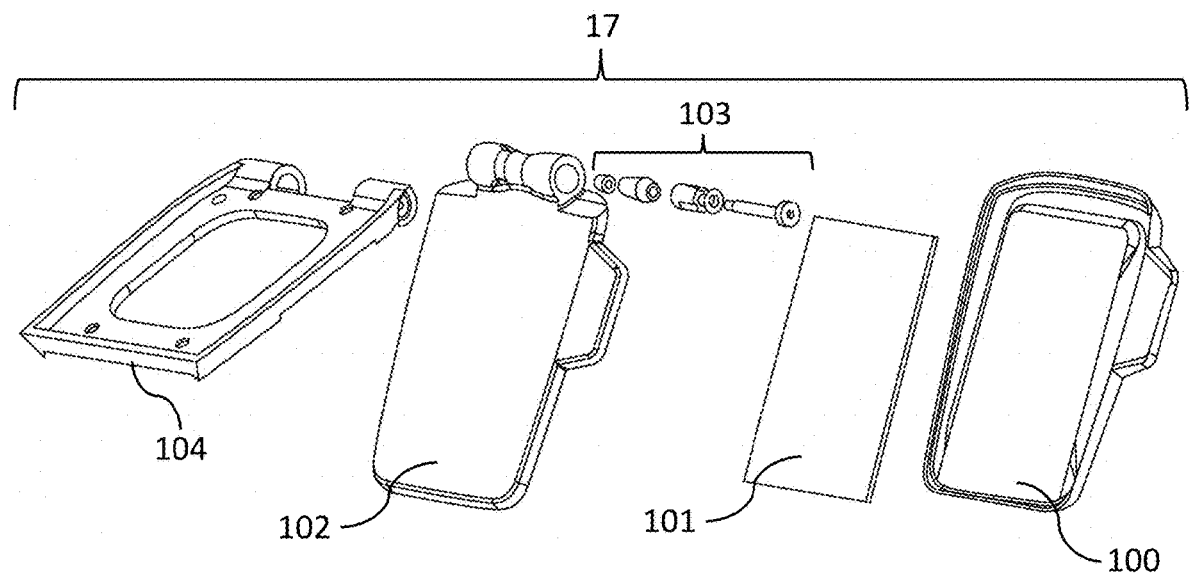
FIG. 9C is an exploded view of an exemplary heads up display combiner subassembly, in accordance with one or more embodiments.

FIG. 9C is an exploded view of an exemplary heads up display combiner subassembly, in accordance with one or more embodiments. As shown, HUD combiner subassembly 17 comprises world facing combiner shell 100, combiner glass 101, user facing combiner shell 102, combiner pivot mechanism 103, and a combiner mount frame 104. All like-numbered elements in FIG. 9C are the same or similar to their corresponding elements in other figures. Outer perimeter groove details are visible on world facing combiner shell 100. Corresponding grooves details may be provided on a facing side of user facing combiner shell 102.

Figure 9D:
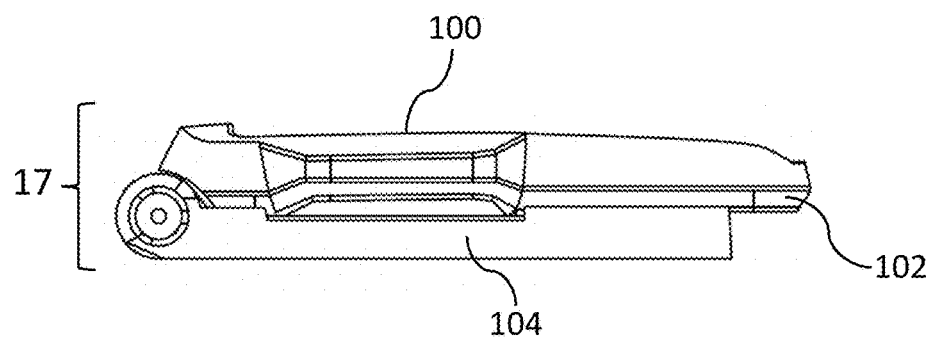
FIG. 9D is a top view of an exemplary heads up display combiner subassembly in a closed position, in accordance with one or more embodiments.

FIG. 9D is a side view of an exemplary heads up display combiner subassembly in a closed position, in accordance with one or more embodiments. HUD combiner subassembly 17 is shown here with world facing combiner shell 100, user facing combiner shell 102, and a combiner mount frame 104. All like-numbered elements in FIG. 9D are the same or similar to their corresponding elements in other figures.

FIG. 9E-9F are a top view and a front view, respectively, of an exemplary heads up display combiner subassembly in a closed position, in accordance with one or more embodiments. FIG. 9F shows 4 combiner mounting holes 105 in a combiner mount frame (e.g., combiner mount frame 104) and combiner adjustment tab 106. All like-numbered elements in FIGS. 9E and 9F are the same or similar to their corresponding elements in other figures. In some examples, there may be more or less than 4 combiner mounting holes 105 provided. In some examples, combiner adjustment tab 106 may provide purchase for a user to easily adjust an angular position of the combiner. If a user has wet or dirty hands, the user may make adjustments to an angle of the combiner by touching only combiner adjustment tab 106, thereby preventing dirt and scratches, or other degradation of a display image, on a display surface of the HUD combiner subassembly. FIGS. 9E-9F also show the location of cross-section DD, for which the cross-section detail is shown in FIG. 9G.

FIG. 9G is a cross-section view of an exemplary heads up display combiner subassembly in a closed position, in accordance with one or more embodiments. This cross-section view shows how world facing combiner shell 100 and user facing combiner shell 102 mechanically interlock. In some examples, world facing combiner shell 100 and user facing combiner shell 102 may be adhesively bonded and comprise corresponding geometry to seal combiner glass 101 within a cavity created when shell 100 and shell 102 are bonded together. For example, regions 107 and 108 show exemplary joints (e.g., overlapping joining parts) that may be provided around a full perimeter of shells 100 and 102. Combiner glass 101 may be adhesively bonded along its perimeter, for example, in region 109.

Figure 10:
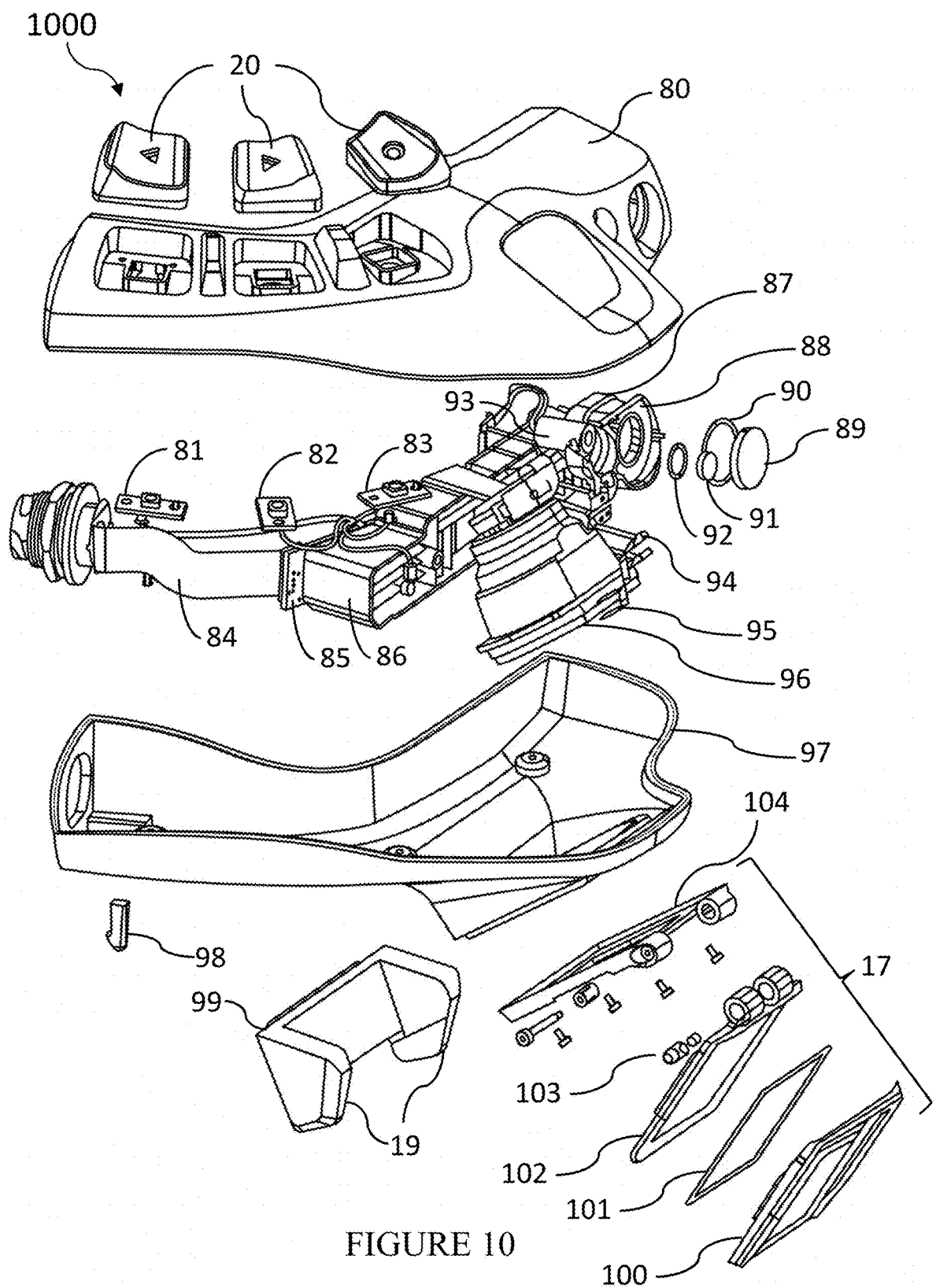
FIG. 10 is an exploded view of an exemplary vision module, in accordance with one or more embodiments.

FIG. 10 is an exploded view of an exemplary vision module, in accordance with one or more embodiments. Exploded view 1000 shows an example of vision module 11 that includes HUD combiner subassembly 17 and user control button(s) 20, as well as a top housing 80, bottom housing 97, user control button PCBAs 81-83, flexible (i.e., flex) cable 84, vision module main PCBA 85, vision module heat sink 86, thermal camera rear mount 87, thermal camera 88, glass 89, retaining ring 90, laser glass 91 (covering laser aperture 74), laser aperture ring 92, laser 93, flex circuit 94, hall effect sensor 95, and optic subassembly 96. All like-numbered elements in FIG. 10 are the same or similar to their corresponding elements in other figures. In some examples, top housing 80 and bottom housing 97 (collectively, "vision module housing") may be plastic injection molded to form a hard plastic shell of impact resistant plastic having properties for withstanding extreme environments (e.g., high heat deflection temperature material properties). In some examples, top housing 80 and bottom housing 97 may be sealed together so that the vision module housing provides ingress protection against water and debris. In some examples, vision module bottom housing 97 may include features for fastening together with vision module top housing 80, as well as a window for a display image to exit. Bottom housing 97 may include sealing grooves around its perimeter to allow for a form-in-place gasket, adhesive, or separate sealing part.

User control button(s) 20 may comprise actuator switches configured to actuate user control button PCBAs 81-83. In an example, user control button PCBAs 81-83 each may include an electro-mechanical switch on a top surface and a small 230 connector on a bottom surface. A wire harness (not shown) may connect the 230 connector to vision module main PCBA 85. Cable connection interface 26 may be ingress protected and may make electrical connection(s) with PCBA 85 using flex cable 84.

Vision module 11 also may include heat sink 86 configured to store heat dissipated from electronic components of vision module 11. In some examples, heat sink 86 may comprise a heat sink core and a heat sink shell, and may be filled with phase change material (e.g., paraffin wax, other hydrocarbons, salt hydrate solutions, and the like) to provide thermal energy storage. For example, phase change material contained in heat sink 86 may be configured to phase change from a solid to a liquid, thereby storing heat dissipated from electronic components of vision module 11. This enables vision module 11 to operate in extreme environments where it is unable to transfer heat to ambient surrounding air.

Thermal camera rear mount 87 may couple to thermal camera 88, for example, positioned around thermal camera 88 to hold it in place. In some examples, thermal camera rear mount 87 may comprise an elastomeric material to provide shock absorption. Glass 89 may be made of germanium glass, including a window through which thermal camera 88 may see through (e.g., receive light and have a view of tracking a user's line of sight). Glass 89 may be retained (e.g., held in place) by retaining ring 90. Retaining ring 90 may be bonded into position in vision module top housing 80. Laser glass 91 also may be positioned (e.g., attached, glued, or otherwise secured) in laser aperture ring 92 in vision module top housing 80 and configured to cover laser aperture 74. Laser 93 (e.g., a pointing laser) may be placed such that it points out of laser aperture ring 92. Flex circuit 94 may connect vision module PCBA 85 to hall effect sensor 95 and optic subassembly 96. Hall effect sensor 95 may be positioned at the end of an ambient light sensor with flex circuit 94 positioned to sense if HUD combiner subassembly 17 is in an open or closed position. Optic subassembly 96 may comprise two or more functional subassemblies, including a display subassembly having an LCOS display and light engine and a lens subassembly comprising one or more lenses.

In some examples, vision module 11 includes retention latch 98 configured to interface with vision module attachment 14 (e.g., latch mechanism 24 thereon). In this example, bumper(s) 19, as described above, may be part of a front bumper 99.

Also shown in exploded view 1000 are components of HUD combiner subassembly 17, including a world facing combiner shell 100, combiner glass 101, user facing combiner shell 102, and a combiner mount frame 104. In an example, combiner glass 101 may be adhesively bonded to world facing combiner shell 100 along its perimeter edge. World facing combiner shell 100 and user facing combiner shell 102 may be bonded together along their perimeter edges to trap combiner glass 101 in a sealed volume. World facing combiner shell 100 and user facing combiner shell 102 may be coated with a hydrophilic material to minimize fogging and optical distortion from moisture (e.g., by increasing water sheeting). World facing combiner shell 100, combiner glass 100, and user facing combiner shell 102, may be assembled with combiner mount frame 104, which may comprise a combiner pivot mechanism 103 (e.g., same or similar to axis of rotation and clutch mechanism 25). Combiner pivot mechanism 103 may be configured to allow a combiner display to hold an open position and allow for user adjustment to one or more pivot angles for improved viewing. In the example shown, the replaceable HUD combiner subassembly 17 may be attached and removed from vision module 11 using a plurality of screws (e.g., screwed through combiner frame 104).

Figure 11A:
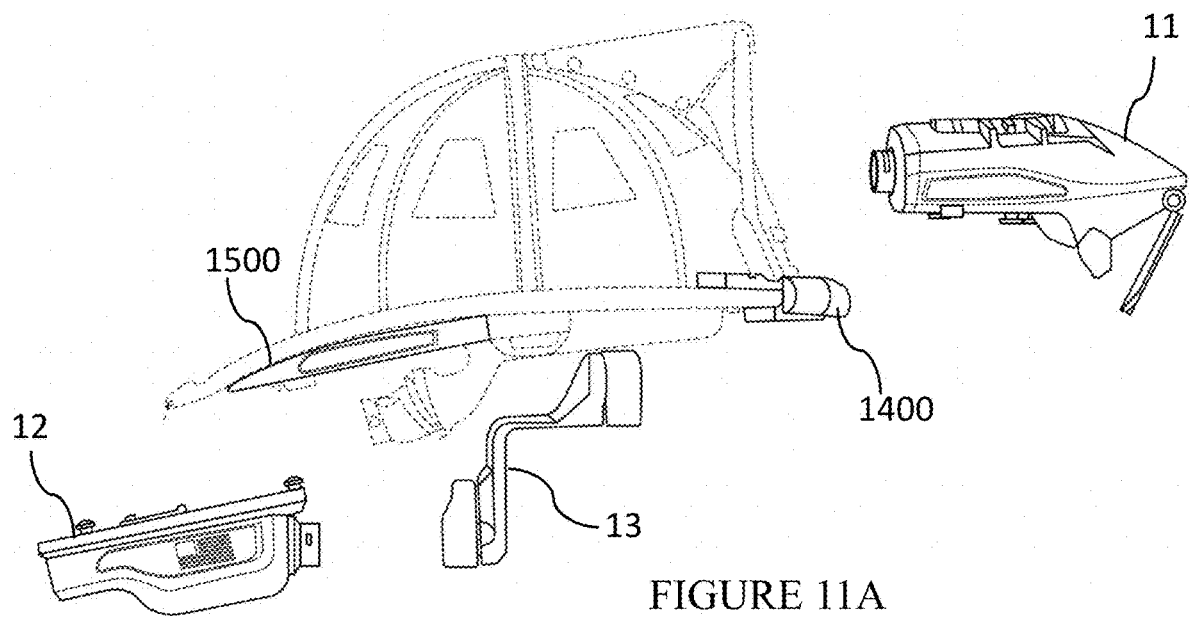
FIGS. 11A-11B are exploded views of an alternative balanced helmet mounted visual communication and navigation system, in accordance with one or more embodiments.
Figure 11B:
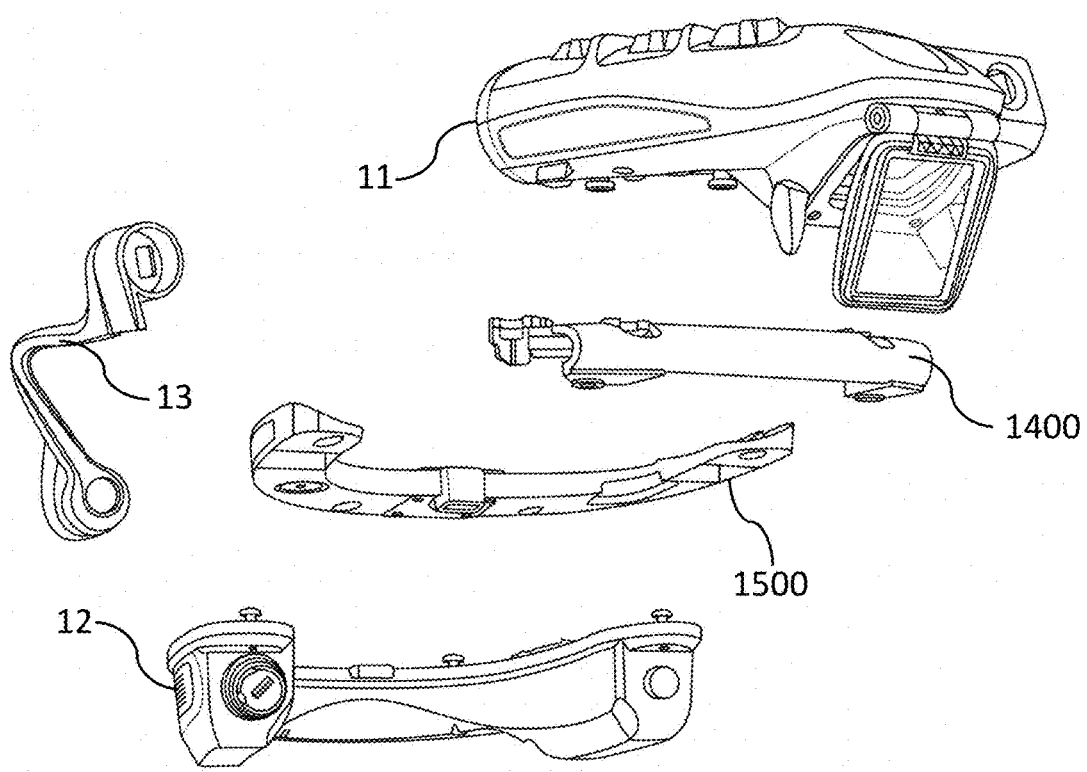

FIGS. 11A-11B are exploded views of an alternative balanced helmet mounted visual communication and navigation system, in accordance with one or more embodiments. All like-numbered elements in FIGS. 11A-11B are the same or similar to their corresponding elements in other figures. FIGS. 11A-11B illustrate alternative vision module attachment 1400 for removably coupling vision module 11 to a helmet, and alternative compute module attachment 1500 for removably coupling compute module 12 to a helmet. Although shown to have a different shape and form, attachments 1400-1500 may comprise many of the same features and components as other attachments described herein (e.g., keyhole slots, mounting features, latch mechanisms, release mechanisms, connection interfaces, etc.).

Figure 12A:
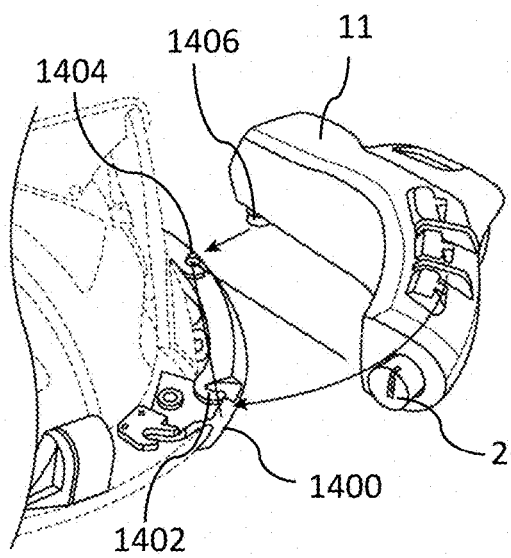
FIGS. 12A-12B are perspective views of an alternative vision module and vision module attachment, in accordance with one or more embodiments.
Figure 12B:
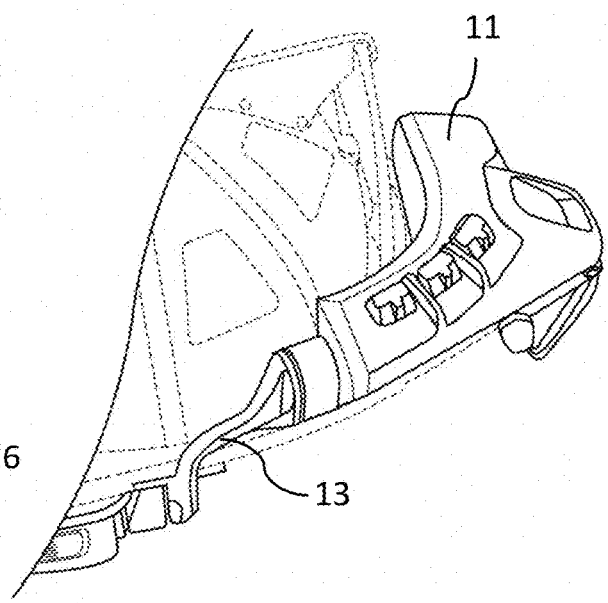

FIGS. 12A-12B are perspective views of an alternative vision module and vision module attachment, in accordance with one or more embodiments. All like-numbered elements in FIGS. 12A-12B are the same or similar to their corresponding elements in other figures. In some examples, alternative vision module attachment 1400 may comprise a slot 1404 on one end configured to receive a mounting stud 1406 in a manner that enables rotation of mounting stud 1406 in slot 1404 such that vision module 11 may swing around an axis of mounting stud 1406. Vision module attachment 1400 also may include a hooked slot 1402 configured to receive another mounting stud (not shown) configured to snap or otherwise removably lock into hooked slot 1402. As shown in FIG. 12B, when vision module attachment 1400 swings into place by snapping into hooked slot 1402, cable connection interface 26 meets up with and couples to cable 13.

Figure 13:
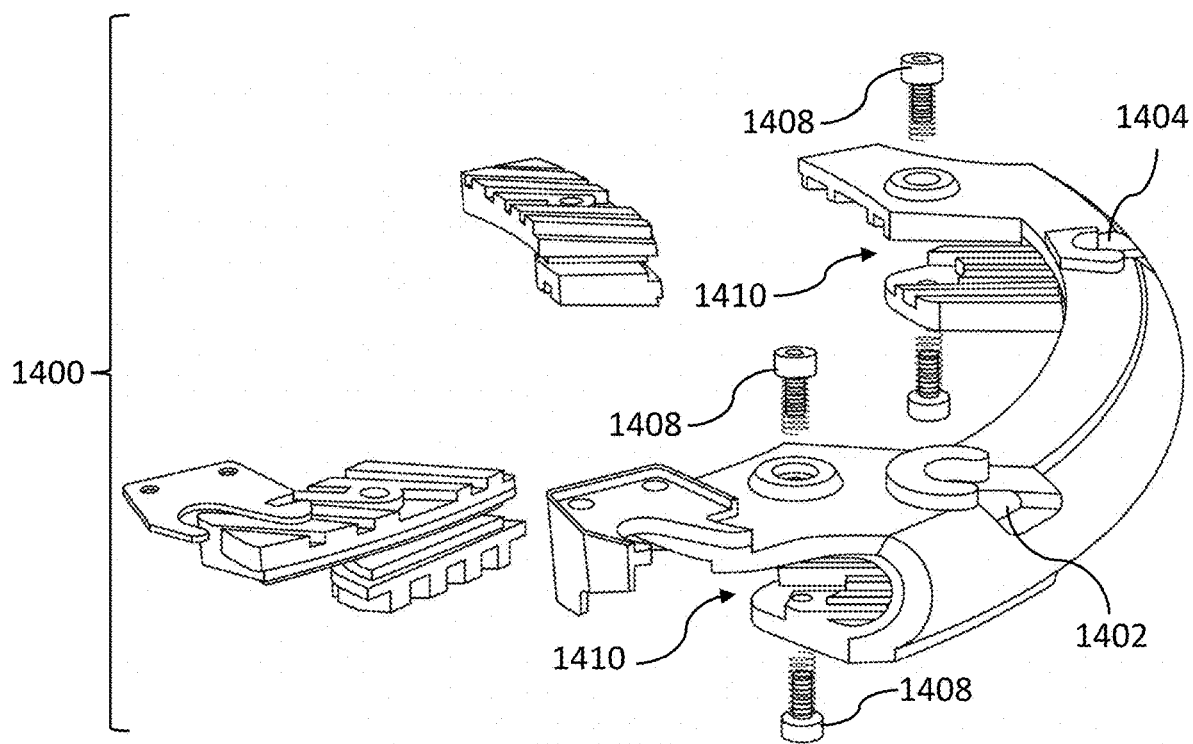
FIG. 13 is an exploded view of the alternative vision module attachment in FIG. 12A, in accordance with one or more embodiments.

FIG. 13 is an exploded view of the alternative vision module attachment in FIG. 12A, in accordance with one or more embodiments. All like-numbered elements in FIG. 13 are the same or similar to their corresponding elements in other figures. As shown, vision module attachment 1400 may be shaped to fit around a brim of a helmet. For example, a helmet brim may be inserted into space 1410 created by a curved shape of vision module attachment 1400. In some examples, vision module attachment 1400 may be coupled to a helmet brim by one or more of fasteners 1408.

A person of ordinary skill in the art will recognize that the systems described herein may be implemented on various types of protective headgear used by emergency response personnel and critical workers for any type of emergency response, military, law enforcement, public safety, and other similar efforts and missions.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A vision module for a helmet mounted visual communication and navigation system, the vision module comprising:
   a sensor provided behind a glass-covered aperture on a front portion of a vision module housing;
   a heads up display (HUD) combiner subassembly comprising a world facing combiner shell, a combiner glass, a user facing combiner shell, and a combiner mount frame;
   a cable connection interface;
   a laser configured to direct a laser beam out of a laser aperture in the front portion of the vision module housing;
   a mating element configured to couple to a vision module attachment; and
   one or more user control buttons.

2. The vision module of claim 1, wherein the sensor comprises one, or a combination, of a thermal camera, a situational awareness sensor, and a biometric sensor.

3. The vision module of claim 2, wherein the situational awareness sensor comprises one, or a combination, of a thermal imaging camera (TIC), a radiometric thermal camera, a drone camera, a spectrometer, a photosensor, a magnetometer, a seismometer, a gas detector, a chemical sensor, a radiological sensor, a voltage detector, a flow sensor, a scale, a thermometer, a pressure sensor, an acoustic sensor, an inertial measurement unit, a GPS sensor, a speedometer, a pedometer, an accelerometer, an altimeter, a barometer, an attitude indicator, a depth gauge, a compass, and a gyroscope.

4. The vision module of claim 2, wherein the biometric sensor comprises one, or a combination, of a heart rate sensor, a blood pressure monitor, a glucose sensor, an electrocardiogram sensor, an electroencephalogram (EEG) sensor, an electromyography (EMG) sensor, a respiration sensor, and a neurological sensor.

5. The vision module of claim 1, wherein the mating element comprises a protrusion configured to couple to a latch pocket on the vision module attachment.

6. The vision module of claim 1, wherein the HUD combiner subassembly comprises a clutch mechanism that includes a combiner pivot mechanism, the clutch mechanism configured to enable a display portion of the HUD combiner subassembly to flip to and from a first position and a second position.

7. The vision module of claim 1, wherein the cable connection interface comprises an ingress protected locking electrical connector configured to mate with a corresponding connection interface on an end of a cable.

8. The vision module of claim 1, further comprising a finger placement guide between at least two of the one or more user control buttons.

9. The vision module of claim 1, wherein the vision module housing is shaped to avoid being a snag hazard.

10. The vision module of claim 1, further comprising the vision module attachment, wherein the vision module attachment is configured to removably couple the vision module to a front portion of the helmet.

11. The vision module of claim 10, wherein the vision module attachment comprises a latch pocket, a preload bumper, and a latching mechanism.

12. The vision module of claim 11, wherein the preload bumper comprises a material configured to be deformed by application of physical pressure and to recover an original shape after removal of the physical pressure.

13. The vision module of claim 11, wherein the material is configured to be compressed when the vision module is coupled to the vision module attachment to create a stable motion-free connection.

14. The vision module of claim 11, wherein the preload bumper comprises a semi-soft elastomer.

15. The vision module of claim 10, wherein the latching mechanism comprises a sliding tab configured to secure the vision module into a locked position wherein a protrusion on the mating element is received by the latch pocket, wherein the sliding tab may be moved to an unlocked position to release the vision module from the vision module attachment.

16. The vision module of claim 1, wherein the world facing combiner shell and the user facing combiner shell are coated with a hydrophilic material configured to minimize fogging and optical distortion from moisture.

17. The vision module of claim 1, wherein the HUD combiner subassembly further comprises an adjustment tab.

18. The vision module of claim 1, wherein the world facing combiner shell and the user facing combiner shell are coupled along a perimeter, thereby creating a cavity within which the combiner glass is enclosed.

19. The vision module of claim 18, wherein the world facing combiner shell, the user facing combiner shell, and the combiner glass, as assembled, is configured to pivot to two or more positions about an axis of a combiner pivot mechanism.

20. The vision module of claim 18, wherein the combiner glass is configured to display a graphical user interface (GUI), and the world facing combiner shell and user facing combiner shell comprising a clear material configured to enable viewing of the GUI.

21. The vision module of claim 1, wherein the HUD combiner subassembly is configured to provide a representation of an environment from a user's point of view.

22. The vision module of claim 1, wherein the HUD combiner subassembly comprises a display facing a user within the user's field of vision.

* * * * *